United States Patent [19]

Rae

[11] 4,038,472

[45] July 26, 1977

[54] NOVEL CURING SYSTEM FOR CONJUGATED DIENE BUTYL ELASTOMERS

[75] Inventor: James A. Rae, Cranford, N.J.

[73] Assignee: Exxon Research and Engineering Company, Linden, N.J.

[21] Appl. No.: 661,286

[22] Filed: Feb. 25, 1976

[51] Int. Cl.² .......................... C08F 8/00; C08F 8/42; C08F 8/06
[52] U.S. Cl. ........................................ 526/48; 526/20; 526/47; 526/54; 526/57
[58] Field of Search ........................ 526/20, 47, 48, 54

[56] References Cited

U.S. PATENT DOCUMENTS

| | | | |
|---|---|---|---|
| 3,047,552 | 7/1962 | Reynolds et al. | 526/54 |
| 3,335,124 | 8/1967 | Larsen | 526/54 |

*Primary Examiner*—William F. Hamrock
*Attorney, Agent, or Firm*—John J. Mahon

[57] ABSTRACT

Conjugated diene butyl (CDB) elastomer copolymers are cured with a system comprising dihydroxybenzene and an oxidant or oxidation catalyst whereby benzoquinone is formed which acts as the crosslinking dienophile. The process allows for satisfactory cures at room temperature.

9 Claims, No Drawings

NOVEL CURING SYSTEM FOR CONJUGATED DIENE BUTYL ELASTOMERS

BACKGROUND OF THE INVENTION

This invention relates to conjugated diene butyl rubber elastomers and more particularly to the method for curing this category of elastomeric copolymers.

Conjugated diene butyl elastomers are known and are described in U.S. Pat. No. 3,775,387 issued Nov. 27, 1973 to Baldwin and U.S. Pat. 3,816,371 issued June 11, 1974 to Baldwin and Malatesta. Generally, these elastomers are copolymers consisting of from 85 to 99.5% by weight of a $C_4$–$C_7$ isoolefin combined with 15 to 0.5% by weight of a conjugated diolefin having 4 to 14 carbon atoms, the copolymer containing randomly distributed sites of conjugated diene unsaturation. These elastomers are preferably prepared by dehydrohalogenation of halogenated butyl rubber.

As described in the aforesaid patents, these elastomers can be cured with sulfur and sulfur-containing vulcanizing agents or co-vulcanized with general purpose rubbers. It is also known that these CDB elastomers can be cured with polyfunctional dienophiles such as m-phenylenebis-maleimide, ethylene glycol dimethacrylate. Generally, these curing agents, except for highly reactive dienophiles, require the use of fairly high temperatures, that is, in excess of 300° F., in order to promote an effective cure. The present invention provides a method wherein the cure may be carried out at room temperature or temperatures in excess of room temperature but, in either case, the rate of cure is easily controlled by modification of the cure system package through regulation of the oxidation reaction which is necessary to formation of the benzoquinone dienophile crosslinking agent.

In accordance with the present invention, there has been discovered a method for curing and crosslinking conjugated diene butyl rubber elastomers, said elastomers being copolymers consisting of 85 to 99.5% by weight of a $c_4$–$C_7$ isoolefin combined with 15 to 0.5% by weight of a $C_4$–$C_{14}$ conjugated multi-olefin, the copolymer containing randomly distributed sites of conjugated diene unsaturation, the method comprising adding to said elastomer about 1 to 6, preferably 2 to 4, parts per hundred parts by weight of 1,4-dihydroxybenzene and an effective amount of an oxidation catalyst or an oxidizing agent thereby oxidizing the dihydroxybenzene to 1,4-benzoquinone in situ with said benzoquinone curing said elastomer at room temperature or temperatures in excess of room temperature by formation of crosslinking moieties between elastomer polymer chains.

In the present invention the curing may be carried out at room temperature or temperatures in excess of room temperature and the desired curing temperature will have an effect on the proper choice of oxidizing agent or oxidation catalyst. In room temperature curing and curing at temperatures moderately above room temperature, that is, temperatures of about 60° to 120° F., a metal carboxylate oxidation catalyst is employed for optimum results. The oxidizing agents alone, in the absence of the oxidation catalysts, are generally not effective at these temperatures. However, at temperatures in excess of about 200° F. oxidizing agents have been found to be effective with or without the presence of a carboxylate oxidation catalyst. At these moderately high temperatures, that is, about 200° to 350° F., satisfactory cures are obtained over periods of about 10 to 40 minutes. Conventional curing agents for CDB elastomers such as sulfur-based curing agents generally require curing temperatures having a minimum of about 290° to 300° F.

The overall crosslinking process may be generalized by the following equations showing oxidation of dihydroxybenzene to benzoquinone and the crosslinking of polymeric chains by the benzoquinone so formed.

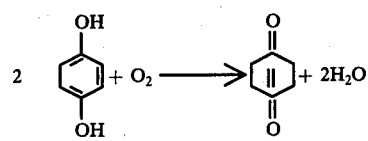

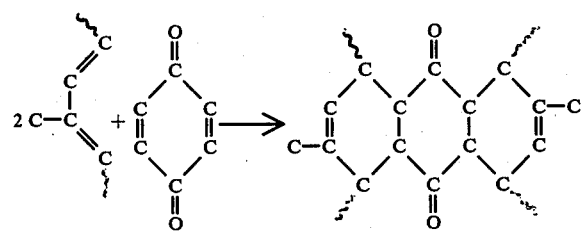

The conjugated diene elastomeric copolymers which are cured in accordance with the present invention are known and are described in U.S. Pat. No. 3,816,371 issued June 11, 1974 to Baldwin et al, and U.S. Pat. No. 3,775,387 issued Nov. 27, 1973 to Baldwin as well as in U.S. application Ser. No. 465,479 filed by Baldwin et al, on Apr. 30, 1974, all of which are incorporated herein by reference.

These conjugated diene butyl elastomers may be generally described as copolymers consisting of from 85 to 99.5% by weight of a $C_4$–$C_7$ isoolefin combined with 15 to 0.5% by weight of a conjugated diolefin having 4 to 14 carbon atoms, the copolymer containing randomly distributed sites of conjugated diene unsaturation. Moreover, as described in U.S. application Ser. No. 465,479 filed by Baldwin et al on Apr. 30, 1974, the conjugated diene functionality may be present such that both olefin units are in the backbone chain, or both are outside of the chain, or one may be inside the chain and one outside, or both may be present in a ring, such as by dehydrohalogenation of allylic halogen of cyclopentadiene. Dehydrohalogenation of a butyltype polymer prepared from dimethylbutadiene and isobutylene can provide conjugated olefinic structures having the following configurations:

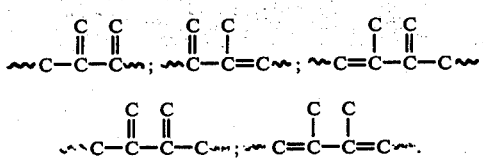

Preferably the copolymers useful in the present invention are copolymers of isobutylene and isoprene, a major portion of the isoprene units combined therein having conjugated diene unsaturation and may be represented by the following structure:

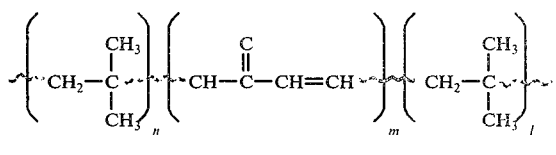

and

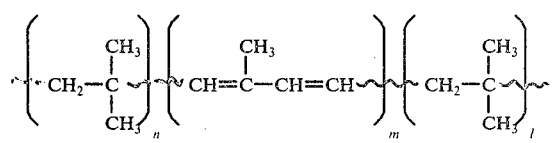

where n + m represent the number of isoolefin units incorporated into the butyl rubber polymer backbone and m represents the number of conjugated diolefin units present substantially as isolated units.

The preferred method of preparing the elastomers useful in the present invention is through dehydrohalogenation of a halogenated butyl rubber.

The term "butyl rubber" is used in the industry to describe copolymers made from a reaction mixture containing 70 to 99.5% by weight of a $C_4$-$C_7$ isoolefin such as isobutylene and 30 to 0.5% by weight of a $C_4$-$C_{14}$ conjugated multiolefin such as isoprene. The resulting copolymers contain 85 to 99.5% by weight of isoolefin and 0.5 to 15% of combined multi-olefin. The polymer backbone of commercial butyl rubber consists primarily of isobutylene units with just a few percent of isoprene units, the latter contributing the small amount of unsaturation present in butyl rubber.

Halogenated butyl rubber is described in U.S. Pat. No. 3,099,644 and is typified by the following formula:

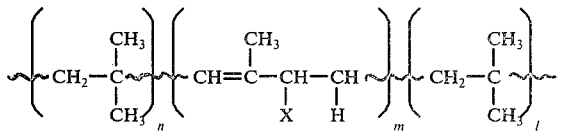

Halogenated butyl rubber may be prepared by halogenating butyl rubber in a solution containing 1 to 60% by weight butyl rubber in a substantially inert $C_5$-$C_8$ hydrocarbon solvent such as pentane, hexane, heptane and contacting the solution with halogen gas for about 2 to 25 minutes whereby halogenated copolymers form containing up to 1 or somewhat more halogen atom per double bond initially present. Illustrative is "Chlorobutyl 1068" a chlorinated butyl rubber which before halogenation contains about 1.8 mole % unsaturation and a viscosity average molecular weight of about 450,000.

The conjugated diene butyl elastomers useful in the present invention are preferably prepared via dehydrohalogenation of a halogenated butyl rubber. Generally this process comprises contacting a solution of halogenated butyl rubber with: (1) a soluble metal carboxylate where the metal is selected from the metal of Groups IIb, IVa and VIII of the Periodic Table; (2) a soluble carboxylic acid; and (3) and oxide or a hydroxide of the metal selected from Groups Ia and IIa of the Periodic Table. This dehydrohalogenation process is described in detail in U.S. Pat. No. 3,775,387 issued Nov. 27, 1973 to Baldwin et al and is incorporated herein by reference.

The mole percent of conjugated diene unsaturation in the elastomers useful in the present invention is from about 0.5 to about 2.5 and these conjugated diene butyl elastomer copolymers have a number average molecular weight generally from about 5,000 to 500,000.

Room temperature curing or curing at temperatures moderately in excess of room temperature using a metal carboxylate oxidation catalyst constitutes a preferred embodiment of the present invention. The preferred temperature range is about 60° to about 120° F. and the curing process is carried out over a period of about 20 to 200 hours. A heavy metal carboxylate catalyst such as vanadium, cobalt, copper or iron carboxylate is used. Generally salts of carboxylic acids having 8 to 20 carbon atoms are useful such as the naphthenates, octoates or neodecanoate. Cobalt and copper naphthenate and neodecanoate have been found particularly effective and are preferred. These catalysts are used in amounts ranging from about 0.05 to 0.25 phr (parts per hundred) parts by weight of elastomer, preferably about 0.1 phr. Room temperature curing is of particular value in that it allows for the use of the CDB elastomers in the areas of caulks, sealants and the like where ambient temperature curing is a requirement for practical utility. Rapid cures may be obtained at elevated temperatures of about 200° to 350° F. in relatively shorter time periods in accordance with the present invention. For example, it has been found that acceptable cures to desirable physical properties can be achieved at 10 to 30 minutes at temperatures of 250° to 320° F. using a suitable oxidizing agent in the presence or absence of the carboxylate catalyst. It has been found that at these elevated temperatures it is somewhat more preferable to employ only an oxidizing agent as the means for promoting the oxidation of 1,4-dihydroxybenzene to 1,4-benzoquinone, the latter compound functioning as the crosslinking dienophile moiety. However, the oxidation catalyst, when used alone, is also effective at these temperatures.

Suitable oxidizing agents for high temperature curing in accordance with the present invention include the metallic inorganic oxides such as lead dioxide, red lead ($Pb_3O_4$), manganese dioxide and the like and the organic peroxides including the hydroperoxides and diacyl peroxides as exemplified by t-butylhydroperoxide, ethyl hydroperoxide, cumene hydroperoxide, t-pentyl hydroperoxide, dimethyl peroxide, dicumyl peroxide, cumyl methyl peroxide, t-butyldiphenylmethyl peroxide, di-t-butylperoxide, dibenzoyl peroxide, dilauroyl peroxide, and the like, generally the organic radicals of said peroxides having about 1 to 12 carbon atoms. Benzoyl peroxide and dicumyl peroxide are preferred.

The quantity of oxidizing agent is somewhat variable depending on the amount of 1,4-dihydroxybenzene present. Generally there is employed sufficient oxidizing agent on a stoichiometric equimolar basis necessary to effect the oxidation and usually a molar excess. The amount of the oxidizing agent present may be expressed as a molar ratio of about 0.5:1 to 2:1, preferably about 1:1 to 1.5:1, relative to the moles of 1,4-dihydroxybenzene in the elastomer.

The invention is further illustrated by the following examples which are not to be considered as limitative of its scope.

EXAMPLE 1

10 grams of an isobutylene-isoprene conjugated diene butyl elastomer (1.37 mole % diene, Mooney viscosity (ML 212° F. 1+8) = 49) were dissolved in 100 ml of tetrahydrofuran (THF). To this cement was added the below-indicated (Table I) quantities of 1,4-dihydroxybenzene and oxidation catalysts as indicated. Samples in bottles were placed on a rotating wheel at room temperature and the time to cure, as indicated by visible gelation, was recorded. The data for this example is set forth in Table I.

g. FEF Carbon Black and 85 g. FLEXON 845 oil. To aliquots of this mix (80 grams) were added the below indicated quantities of curatives on a cold mill. These compounds were then cured at the below indicated temperatures. The data is presented in Table IV below.

TABLE I

| Grams 1,4-Dihydroxybenzene | Oxidation Catalyst | Catalyst Conc., phr | Gelation Time, Hours |
|---|---|---|---|
| None | None | — | >1800 |
| None | Cobalt Naphthenate | 0.1 | >1800 |
| None | Copper Neodecanoate | 0.1 | >1800 |
| 0.33 | None | — | >1800 |
| 0.33 | Cobalt Naphthenate | 0.1 | 72 |
| 0.33 | Copper Neodecanoate | 0.1 | 120 |
| 0.33 | Iron Octoate | 0.1 | 384 |

TABLE II

| Grams 1,4-Dihydroxybenzene | Grams Peroxide | Grams Catalyst (Neodecanoate) | Gelation Time, Hours |
|---|---|---|---|
| None | None | None | >1500 |
| 0.33 | 0.42 Benzoyl | 0.1 Vanadium | 984 |
| 0.33 | 0.42 Benzoyl | 0.1 Cobalt | 312 |
| 0.33 | 1.0 Dicumyl | 0.1 Vanadium | >1500 |
| 0.33 | 1.0 Dicumyl | 0.1 Cobalt | 1008 |
| 0.33 | 0.7 $PbO_2$ | — | 1200 |
| 0.33 | 0.26 MnO | — | >1500 |
| 0.33 | 2.0 $Pb_3O_4$ | — | >1500 |

EXAMPLE 2

CURING CDB (IN SOLUTION) AT ROOM TEMPERATURE USING OXIDIZING AGENTS

Twenty grams of CDB of Example 1 were dissolved in 200 ml. toluene. To this cement was added the below indicated quantities of 1,4-dihydroxybenzene, peroxides, and catalysts. The jars were placed on a shaker and observed periodically for gelation. The data and results are in Table II below.

EXAMPLE 3

AIR CURING BULK CDB POLYMER

Three hundred grams of CDB polymer and nine grams of 1,4-dihydroxybenzene were mixed on a cold rubber mill. This masterbatch was divided into three equal portions (103 g). Each portion was returned to the mill and the appropriate catalyst solution added. Each compound thusly prepared was then pressed into a thin sheet which was placed in an oven at 50° C. Samples were removed at specified times for volume swell analyses. Data and results are set forth in Table III below.

EXAMPLE 4

CURING COMPOUNDED CDB WITH 1,4-DIHYDROXYBENZENE AND INORGANIC OR ORGANIC PEROXIDES AT ELEVATED TEMPERATURES BY COMPRESSION MOLDING

A masterbatch of the following ingredients was mixed in a "B" Banbury - 850 g. CDB of Example 1, 425

TABLE III

| Compounds - Parts by Weight | A | B | C |
|---|---|---|---|
| CDB Polymer (1.37) mole % diene, Mooney Viscosity (ML 212° F. 1 + 8 = 49) | 100 | 100 | 100 |
| 1,4-Dihydroxybenzene | 3 | 3 | 3 |
| Cobalt Neodecanoate Paste (as $Co^{++}$) | | 0.05 | |
| Copper Neodecanoate Liquid (as $Cu^{++}$) | | | 0.05 |
| Volume Swell Analyses | | | |

| | Swell Ratio[a] | | |
|---|---|---|---|
| Days | A | B | C |
| 0 | 0 | 0 | 0 |
| 1 | — | — | 18.5 |
| 2 | — | — | 15.6 |
| 4 | — | — | 13.6 |
| 8 | — | 44.3 | 11.6 |
| 30 | 32.8 | 17.8 | 8.3 |

| | Wt. % Soluble[b] | | |
|---|---|---|---|
| Days | A | B | C |
| 0 | 100 | 100 | 100 |
| 1 | — | — | 7.2 |
| 2 | — | — | 5.7 |
| 4 | — | — | 3.4 |
| 8 | — | 49.1 | 2.3 |
| 30 | 42.3 | 14.7 | 2.7 |

[a]Wt. cyclohexane + wt. gel polymer/wt. gel polymer
[b]Wt. polymer sample - Wt. dry gel polymer × 100/wt. polymer sample
Note: Low swell ratios indicate a high crosslink density

TABLE IV

| | 1 | 2 | 3 | 4 | 5 | 6 | 7 | 8 | 9 |
|---|---|---|---|---|---|---|---|---|---|
| Masterbatch | 80 | 80 | 80 | 80 | 80 | 80 | 80 | 80 | 80 |
| 1,4-Dihydroxybenzene | 1.65 | 1.65 | 1.65 | 1.65 | 1.65 | 1.65 | 0.9 | 1.65 | 1.65 |
| Dicumylperoxide | | | 5.5 | 2.5 | | | | | |
| Red Lead ($Pb_3O$) | | | | | 5.0 | | | | |
| Lead Dioxide ($PbO_2$) | | | | | | 3.6 | 2.2 | | |
| Benzoyl Peroxide | | | | | | | | | 0.5 |
| Vanadium Neodecanoate | | | | | | | | | |
| Copper Neodecanoate | | 0.1 | | | | | | | |
| Cure Time, Minutes | 10 | 10 | 30 | 30 | 20 | 20 | 20 | 20 | 20 |

TABLE IV-continued

|  | 1 | 2 | 3 | 4 | 5 | 6 | 7 | 8 | 9 |
|---|---|---|---|---|---|---|---|---|---|
| Cure Temperature, ° F. | 402° | 280° | 320° | 320° | 250° | 250° | 250° | 250° | 250° |
| PHYSICAL PROPERTIES |  |  |  |  |  |  |  |  |  |
| Hardness, Shore A | 41 | 45 | 44 | 41 | 47 | 45 | 45 | 42 | 44 |
| 100% Modulus, psi | 85 | 100 | 150 | 100 | 170 | 160 | 120 | 140 | 140 |
| 300% Modulus, psi | 335 | 565 | 1000 | 560 | 895 | 920 | 720 | 800 | 820 |
| Tensile Strength, psi | 800 | 1400 | 1415 | 1430 | 1200 | 1690 | 1520 | 1380 | 1370 |
| Elongation % | 510 | 560 | 410 | 520 | 400 | 480 | 500 | 410 | 400 |

What is claimed is:

1. A method of curing a conjugated diene butyl elastomeric copolymer, said copolymer consisting of 85 to 99.5% by weight of a $C_4$-$C_7$ isoolefin and 15 to 0.5% by weight of a conjugated $C_4$-$C_{14}$ diolefin, said copolymer having randomly distributed sites of conjugated diene unsaturation and having a number average molecular weight from about 5000 to 500,000, said method comprising adding to said elastomer about 1 to 6 parts per hundred parts by weight of elastomer of 1,4-dihydroxybenzene and a metal carboxylate oxidation catalyst or oxidizing agent or mixture thereof in amounts effective to promote the oxidation of dihydroxybenzene to 1,4-benzoquinone, said benzoquinone crosslinking copolymer chains whereby a crosslinked cured elastomer product is formed, said oxidizing agent only being present when curing temperatures in excess of 200° F. are employed.

2. The method of claim 1 wherein said curing is carried out at temperatures of about 60° to 120° F. and said oxidation catalyst is cobalt or copper carboxylate having 8 to 20 carbon atoms.

3. The method of claim 2 where the carboxylate is a naphthenate or neodecanoate.

4. The method of claim 1 where the curing is carried out at a temperature in excess of 200° F.

5. The method of claim 4 wherein the oxidizing agent is an inorganic metal oxide or an organic peroxide.

6. The method of claim 5 wherein the metal oxide is lead, dioxide, red lead or manganese dioxide.

7. The method of claim 5 wherein the organic peroxide is dicumyl peroxide or benzoyl peroxide.

8. The method of claim 1 wherein the elastomer is a conjugated diene copolymer of isobutylene and isoprene.

9. The method of claim 1 wherein the elastomer is prepared by dehydrohalogenation of halogenated butyl rubber.

* * * * *